United States Patent Office 3,415,667
Patented Dec. 10, 1968

3,415,667
LINING MATERIAL FOR OXYGEN BLOWING BASIC STEEL MAKING VESSELS
John L. Cummings, Sr., deceased, late of Clearwater, Fla., by Marjorie G. Cummings, executrix, Clearwater, Fla.
No Drawing. Continuation-in-part of application Ser. No. 528,048, Feb. 17, 1966. This application Jan. 13, 1967, Ser. No. 609,261
5 Claims. (Cl. 106—58)

ABSTRACT OF THE DISCLOSURE

A refractory composition for use as a lining material in an oxygen blowing basic steel making vessel and a process for making the refractory composition in which the coarse refractory aggregates are wetted with a corbonaceous solvent, admixed with a mixture of powdered pitch and fine refractory aggregates and molded into a pressed shape. During admixing the solvent liquifies the powdered pitch so that the liquified pitch encapsulates the coarse aggregates. The pressed shape is then heated to an elevated temperature to evaporate the solvent and solidify the pitch and form a strong pitch bond for the refractory aggregates. The solvent is a carbonaceous liquid that readily liquifies the powdered pitch and has the property of remaining fluid at about room temperature and evaporating at an elevated temperature below the carbonization temperature of the pitch. The preferred solvent is a chlorinated aliphatic hydrocarbon such as trichloroethylene.

CROSS REFERENCES TO RELATED APPLICATIONS

This application is a continuation-in-part of copending application, Ser. No. 528,048 filed Feb. 17, 1966 now abandoned which was in turn a continuation-in-part of application Ser. No. 374,804, filed July 12, 1964 and now abandoned. The latter application was in turn a continuation-in-part of application Ser. No. 262,333, filed Mar. 14, 1963, and abandoned on Mar. 14, 1966 in favor of a continuation-in-part of application Ser. No. 516,076, filed Dec. 27, 1965.

BACKGROUND OF THE INVENTION

Field of the invention

This invention relates to a refractory composition suitable for use in lining an oxygen blowing basic steel making vessel and the process for making the refractory composition and more particularly to the refractory composition and a cold process for bonding refractory aggregates into a shaped article by liquifying high melting powdered pitch on the surface of the aggregate and thereafter solidifying the pitch by evaporating the solvent and bonding the aggregates with the solidified pitch.

Description of the prior art

In the conventional hot forming process, both the pitch and refractory aggregate are heated to an elevated temperature so that the pitch remains sufficiently liquified to be thoroughly admixed with the refractory aggregates. This admixture at the elevated temperature is charged into a mold and pressed into a shaped brick and the formed brick is permitted to cool in the mold until it rigidifies. A hot process has many disadvantages. For example, all of the process steps must be carried out at an elevated temperature in order to maintain the pitch in a fluid or liquid state. At this necessary elevated temperature, the lighter distillate fractions vaporize and adversely affect the working conditions in the mixing area. In addition, the handling and processing of the hot sticky mixture or refractory aggregates and melted pitch is difficult and separate handling procedures required increases the cost of the lining material.

Even after the bricks are formed and cooled, they are still pliable and subject to deformation by warpage. Some of the bricks often expand at the center of their face so that they are not uniform in shape and size. The edges of the brick frequently spall or fracture from an inadequate pitch bond. Because of these defects and non-uniformity in shape, special procedures must be followed in lining the steel making vessels with the bricks formed by the hot pitch bonding process. There is a need for a simple process for bonding the refractory aggregates with a carbonaceous material and obtaining a refractory brick that is uniform in size and shape. Such a brick would eliminate the open joints between the bricks in the steel making vessels and simplify the special procedures now followed in lining the steel making vessels.

British Patent 690,859 to Crawley suggests preparing a ramming mix or brick from a refractory aggregate and a high melting powdered pitch. Crawley recognizes the problem of consolidating the mixture on ramming or molding and suggests adding a lubricating liquid to the admixture of refractory aggregate and powdered pitch to make the surfaces of the pitch particles oleaginous and thereby improve the consolidation of the mixture. The lubricant suggested by Crawley is a liquid hydrocarbon such as kerosene, benzine, and creosote. Crawley uses the lubricant to improve the consolidation of the admixture. In Crawley, however, the pitch particles remain discrete and are mixed as discrete particles with the refractory aggregate. The lubricant is intended only to make the surface of the particles oleaginous and thereby improve the mixing properties of the refractory aggregate and the particulate powdered pitch. As a lubricant, Crawley suggests the use of any carbonaceous material that makes the pitch particles slippery and includes as a suitable lubricant creosote that has a boiling range of between 200° C. and 300° C.

U.S. Patent 3,285,760 to Hildinger et al., is also directed to a ramming composition of refractory aggregates and powdered pitch. Hildinger suggests the use of anthracene oil or heavy oil as a solvent or lubricant for the powdered pitch. Hildinger et al. states by the use of this solvent, the storage properties of the admixture are improved and it is possible to store the admixture of refractory aggregate, powdered pitch, and heavy oil for extended periods, and yet attain a rammed density superior to the rammed density of a commercially available tar bonded ramming mix stored for the same period of time. Anthracene oil has, as Hildinger et al. states, a boiling range of between 270° C. and 350° C. and is an intermediate fraction obtained as a by-product in the coke making process. Neither Crawley nor Hildinger et al, suggest liquifying the powdered pitch and thereafter removing the carbonaceous liquid solvent from the admixture after forming the shaped refractory brick and bonding the refractory aggregates with the resolidified pitch, not in its original particulate form, but as a film or coating encapsulating the refractory aggregates. Neither of the patents suggest forming a substantially continuous matrix of resolidified pitch around the refractory aggregate.

It should be understood that U.S. Patent 3,285,760 is not considered prior art of the invention disclosed and claimed in the parent application and is cited only to show the state of the art at the time of filing the instant application.

SUMMARY OF THE INVENTION

Briefly, the invention is directed to a refractory composition capable of being shaped into a refractory brick and comprises refractory aggregate encapsulated with a high melting point pitch that has been liquified by a carbonaceous solvent such as a chlorinated aliphatic hydrocarbon.

The preferred process for making the refractory composition includes wetting the surface of the coarse refractory aggregates with the liquid hydrocarbon by adding the liquid hydrocarbon to the coarse refractory aggregates in a mixer and thereafter adding an admixture of fine refractory aggregates and powdered pitch to the wetted coarse aggregates. The wetted coarse aggregates and the admixture are mixed to liquify the pitch particles by the liquid hydrocarbon on the surface of the coarse aggregates so that the liquified pitch encapsulates substantially all of the refractory aggregates. The mixture may be pressed into a brick in a mold or used in this form as a ramming mixture. The molded or pressed shape is heated to a temperature, preferably below the carbonization temperature of the pitch to evaporate substantially all of the liquid hydrocarbon in the refractory composition. The controlled evaporation of the liquid hydrocarbon resolidifies the pitch and forms a rigid pitch bond for the discrete refractory aggregates. When the brick is subjected to temperatures above the carbonization temperature of the pitch, the pitch carbonizes to form a rigid carbon bond for the refractory aggregates without distorting the shape or dimensions of the pressed shape or brick.

Accordingly, the principal object of this invention is to provide a refractory composition suitable for use in oxygen blowing steel making furnaces that includes refractory aggregates bonded into a pressed shape by a powedered high melting point pitch that has been liquified on the surface of the coarse aggregates by a normally liquid hydrocarbon.

It is another object of this invention to provide a process for making a refractory composition by liquifying a high melting point pitch on the surfaces of refractory aggregates at room temperature and thereafter resolidifying the high melting point pitch at a temperature below the carbonization temperature of the pitch so that the resolidified pitch encapsulates the refractory aggregates and forms a rigid pitch bond therebetween.

These and other objects and advantages of this invention will be more completely disclosed and described in the following specification and the appended claims.

DESCRIPTION OF THE PREFERRED EMBODIMENTS

Extensive studies have been made to determine what factors or properties a refractory composition should have to be suitable for use as a lining in a basic oxygen furnace. After the refractory composition has been positioned in the vessel as a lining and coked or carbonized there are three important factors that affect the life of the lining.

It has been found that the lining must have sufficient strength to support the charge of molten metal in the vessel. It must further have sufficient strength to resist erosion or abrasion by the action of the molten metal and molten slag. The porosity of the coked refractory composition is also a factor that determines the useful life of the lining in the vessel and is directly related to the density of the refractory composition. The exposed surface of refractory lining that has a low porosity is relatively impervious and molten metal or molten slag do not readily penetrate and erode the surface of the lining.

The fixed carbon in the refractory composition is also important from the standpoint of the molten metal or molten slag wetting the refractory lining and eroding or washing away the surface of the lining. It is believed that the carbon in the refractory reduces the wetting of the lining surface by the molten metal or molten slag. A refractory composition suitable for use as a lining in a basic oxygen furnace should therefore have a high density, low porosity, high fixed carbon content and a high crushing strength.

Where the refractory composition is pressed into bricks for use in lining a basic oxygen furnace there are other factors in addition to the previously discussed factors that determine the suitability of forming refractory bricks from the refractory composition. It is highly desirable to have refractory bricks of uniform dimensions with planar surfaces so that the bricks may be positioned in the vessel as a lining without extensive use of substantial quantities of pulverulent refractory material as a base on which the refractory bricks are positioned and as a fill between adjacent bricks.

The green or uncoked refractory brick should have sufficient strength or resistance to crushing so that they may be transported, handled and placed in the furnace without breaking or spalling. The refractory composition should be such that the brick substantially retains its original dimensions and planar surfaces after it is subjected to elevated temperatures in the basic oxygen vessel and coked at elevated temperatures. The refractory composition should be also readily pressed into shaped bricks at moderate pressures to obtain the porosity or high density required for a suitable furnace lining. Where a solvent is employed in the refractory composition the solvent should be readily removed from the admixture after molding by evaporation at relatively low temperatures below the carbonization temperature of the carbonaceous material. The porosity of the green dried brick is indicative of the solvent remaining in the molded refractory composition. Where the porosity is low, a substantial amount of the solvent remains in the refractory composition and upon heating in the basic oxygen vessel the solvent will rapidly gasify and form voids in the refractory brick and also distort the surface of the brick.

Throughout the specification and claims, the size of the refractory aggregates and pitch particles are referred to in either fractions of inches or in Tyler standard screen sizes. Where the sizes are indicated as through a given mesh screen and on a smaller mesh screen, the sizes of the particles are smaller than the mesh size of the openings in the first screen and larger than the opening in the second screen. This particle size relationship is indicated, for example as follows—6 x 65—indicating the particles pass through a 6 mesh screen and are retained on a 65 mesh screen. All percentages and parts of the components in the refractory composition are by weight unless otherwise indicated.

Any conventional refractory aggregate may be used in preparing the herein described refractory composition. It is preferable for the refractory aggregate to be relatively porous so that the liquid solvent penetrates the surface of the aggregate and the powdered pitch dissolved or liquified on the surface of the aggregate by the solvent penetrates the porous aggregate surface to form a firm pitch bond after the solvent is evaporated and the pitch is resolidified.

Conventional refractory materials such as dead burnt magnesite, dead burnt dolomite, periclase, sintered alumina aggregates, calcined bauxite, fused magnesite-chrome grains, silica clays and the like have been found suitable. From the standpoint of the refractory properties of the aggregate, dead burnt magnesite, dead burnt dolomite and periclase are preferred. The invention herein described will, however, satisfactorily bond any of the conventional refractory aggregates and it is not intended to limit this invention to the preferred refractory aggregates.

To illustrate that the solvent is absorbed in the pores of one of the refractory compositions, several large grains of periclase with an apparent porosity of 11.8% were first weighed dry and then imersed in a bath of trichloroethylene solvent. The grains were removed and the grain surface wiped dry. The grains were then reweighed. It was found that the grains increased in weight by 4.65% showing that the trichloroethylene solvent was absorbed in the pores of the periclase grains.

In the refractory composition, well known commonly used grain sizing is satisfactory. Grain sizing ranging from ⅜" to powdered aggregate have been suitably bonded by the herein described process. It is preferred, however, for improved densities and porosities to gap the sizes of the refractory aggregates so that the smaller sized aggregates substantially fill the voids between the larger sized aggregates. An exemplary size consist of refractory aggregates, in this instance, dead burnt dolomite used in the refractory composition is as follows:

| Size fraction, parts by weight: | Screen size T.S.S. |
|---|---|
| 50 | Through 4 mesh on 28 mesh. |
| 20 | Through 28 mesh on 65 mesh. |
| 30 | Through 65 mesh (ball milled to powder). |

Mixtures of the various refractory aggregate may also be used in the refractory composition. For example, relatively coarse aggregates of dead burnt dolomite and relatively fine particles of periclase can be admixed to form a refractory composition having the hereinafter described properties. A suitable size consist of the admixture is as follows:

| Size fraction, parts by weight: | Screen size T.S.S. |
|---|---|
| 18 parts dolomite | Retained on 3 mesh. |
| 42 parts dolomite | Through 3 mesh on 6 mesh. |
| 15 parts periclase | Through 10 mesh on 35 mesh. |
| 25 parts periclase | Through 35 mesh (ball milled to circon size). |

In the following examples and tables, unless indicated otherwise, the refractory aggregates had the following size consist:

| Size fraction, parts by weight: | Screen size T.S.S. mesh |
|---|---|
| 40.0 | 4 x 6 |
| 15.0 | 10 x 35 |
| 15.0 | 35 x 200 |
| 30.0 | −200 |

The pitch bonding material employed in the refractory composition is preferably a hard powdered pitch with a softening point well above room tempearture, as for example, within the range of 132° C. and 232° C. The powdered pitch should have a Conradson coking value of between 50 and 80% by weight. The powdered pitch is preferably comminuted to an extent that it is air blown and 95% by weight passes through a 150 mesh Tyler Standard Screen and 45% passes through a 325 mesh Tyler Standard Screen. A preferred coal tar pitch bonding material for the refractory composition has a softening point between 165° C. and 180° C. and a coking value of between 60 and 80% by weight. The powdered pitch should be of sufficiently fine size that it is readily liquified by a relatively small amount of the hereinatfer described solvents. The powdered pitch in liquified form should have a relatively low viscosity so that it penetrates the pores of the refractory aggregate and when resolidified it forms a relatively rigid bond for the refractory aggregates. As an example of the pitch pickup by the refractory grains, several large grains of periclase were immersed in a bath of trichloroethylene solvent so that the periclase grains absorbed 4.65% by weight trichloroethylene solvent. Thereafter, the grains were rolled in powdered pitch. The grains were dried to evaporate the trichloroethylene solvent and reweighed. It was determined by weight difference that the periclase grains had picked up 14% by weight pitch. As a comparison, periclase grains not treated with a solvent were rolled in powdered pitch and the increase in weight of the periclase grains was 0.25%. The grains were also heated to 350° and rolled in the powdered pitch. The pitch pickup by the hot rolling process was 4.66% pitch—much less than by the solvent process.

The amount of powdered pitch employed in the refractory composition is dependent to a degree on the surface area and the porosity of the refractory aggregate. It has been found using refractory aggregates of the previously described size consist that between 5 to 8 parts by weight powdered pitch is suitable to provide the desired strength and the desired carbon retention after coking. It is preferred to use only a sufficient amount of the powdered pitch to form the desired bond for the refractory aggregates. Because the pitch, when liquified, encapsulates all of the refractory aggregates and is thereafter resolidified and carbonized as a film on the refractory aggregates, wetting the surface of the refractory lining by the molten metal is maintained at a minimum.

The solvent or mixtures of solvents used in preparing the refractory composition should preferably be liquid at room temperature so that the solvent will thoroughly wet the surface of the refractory aggregate under normal operating temperatures even during the winter months. The viscosity of the solvent should also be relatively low so that the solvent will penetrate the pores of the refractory aggregate and permit the pitch particles to dissolve and attach themselves to the refractory aggregate and form a firm bond. The boiling range or the temperature range at which the solvent volatilizes or evaporates is also important. It is highly desirable to evaporate a substantial portion of the solvent at a temperature below the carbonization temperature of the pitch and preferably below the softening point of the pitch. Where the refractory composition must be heated to a temperature approaching the carbonization temperature of the pitch, there is a tendency for the outer surfaces of the molded shaped brick to harden or carbonize and trap the remaining solvent within the brick. Further heating will cause the solvent in the center of the brick to vaporize and crack or rupture the brick surface.

It has been found that a liquid hydrocarbon solvent or mixtures of liquid hydrocarbon solvents that have a boiling range of between about 80° C. and 200° C. are suitable. Below 80° C. the solvent evaporates too quickly during the mixing process and above 200° C. remains entrapped in the molded brick after drying.

The powdered pitch should be sufficiently soluble in the solvent or mixtures of solvents to permit the pitch to wet the surface of the aggregate and attach itself to the aggregate to provide a good bond or contact between the pitch and the aggregate. The pitch dissolved in the solvent should readily adhere to the refractory aggregate. The solvent should also have sufficient solvent action within a reasonable time to dissolve or liquify the powdered pitch on the aggregate surface so that the pitch in liquid form intimately contacts the aggregate and the dissolved pitch thoroughly wets the aggregate.

From the standpoint of safety, the solvent should be noncombustible and nonexplosive. A substantial portion of the solvent is removed from the refractory composition in the hereinafter described process at elevated temperatures and thereafter the refractory composition containing some of the solvent is heated to high temperatures so that the combustibility and explosive properties affect the safety of the process.

The preferred solvents, in addition to readily dissolving the powdered pitch, appear to liquify the pitch to an extent that the viscosity is reduced substantially and the liquified pitch readily flows or disperses over a ceramic surface as a thin film. The normally liquid chlorinated hydrocarbons and mixtures of the chlorinated hydrocarbons, either the aliphatic hydrocarbons having two or more carbon atoms or the aromatic liquid hydrocarbons, are solvents that have the above desirable properties. The preferred liquid hydrocarbons contain three chlorine atoms and are referred to as trichlorinated hydrocarbons. The solvents or mixtures of solvents which appear to produce a refractory composition having all of the previously discussed desirable properties are the above chlorinated hydrocarbons. The solvents found most suitable are trichlorethylene and trichlorobenzene among the chlorinated liquid hydrocarbons. It has been found that the amount of solvent required in the process is dependent to a degree on the surface area and porosity of the aggregate. Where the conventional refractory aggregate, such as dead burnt magnesite, dead burnt dolomite and periclase or mixtures thereof are used, between 2 to 11 parts by weight of the solvent should be admixed therewith. Between about 3 and 5 parts by weight solvent has been found to provide the desired pitch bond in the refractory composition. It should be understood, however, the invention resides, not only in the solvent that distributes the pitch over the refractory aggregate surface, but also the process for making the refractory composition and forming molded shapes therefrom.

The preferred method of preparing the refractory composition of the present invention includes comminuting the refractory aggregates to a preselected size, as for example, to a size consist of between 4 and 200 mesh. The comminuted aggregates are screened so that the particles larger than 200 mesh are considered the coarse aggregates and are fed to a first mixing device. The remaining fine aggregates are thereafter sent to a ball mill where they are comminuted to a size where about 70% of the fine aggregate have a size less than 200 mesh. The fine aggregates and between 5 and 8% parts by weight of dry powdered pitch are fed to a separate second mixing device and thoroughly admixed. Between about 3 to 5 parts by weight of the liquid hydrocarbon solvent is fed to the first mixer where it is thoroughly admixed with the coarse aggregates to an extent that substantially all of the coarse aggregates are wetted by the solvent. The admixture of fine aggregates and powdered pitch is then added to the wetted coarse aggregates and thoroughly mixed until the wetted coarse aggregates are coated with the dry pitch particles. The pitch particles on the surface of the wetted coarse aggregates liquify and encapsulate the coarse aggregates. A portion of the liquified or dissolved pitch penetrates the pores of the coarse aggregates. The liquification of the powdered pitch further encapsulates the fine aggregates to thereby provide a pitch bond for substantially all of the refractory aggregates.

The admixture of the wetted refractory aggregates encapsulated in a liquified pitch coating is then placed in a mold and pressed into shape. The above process is carried out at ambient or room temperature. The pressed shapes or bricks are thereafter removed from the mold and positioned on a conveying device to be transported to an oven. Within the oven the pressed shapes or bricks are slowly dried at a temperature of between about 220° F. and 350° F. for a sufficient period to evaporate substantially all of the solvent. Drying for a period of 24 hours at the elevated temperature has been found satisfactory to remove the solvent from the brick without distorting the shape of the brick. During the drying process, the liquified solvent evaporates and the pitch resolidifies to form a pitch bond for the refractory aggregates in the refractory compositions. The shaped bricks are then palletized for shipment and maintain their pressed shape. Where desired, after the bricks have been dried and substantially all of the liquified solvent removed therefrom, the shaped bricks may thereafter be subjected to a temperature of about 600° F. where the external surface of the bricks are tempered and slightly carbonized.

The above described process provides improved green crushing strength, that is a crushing strength of the bricks after drying and before the bricks have been coked. Superior coked strength is obtained by the above process when compared with other processes for admixing the aggregate, solvent and powdered pitch. Other methods of mixing the above constituents do not provide the desired strength in the refractory composition.

Examples.—Table I, set forth below, illustrates the physical properties of the refractory composition prepared by the preferred process and by various other mixing processes. In Process 1, the preferred process above described, the coarse aggregates and solvent were premixed and premixed aggregate fines and powdered pitch are thereafter added to the solvent wetted coarse aggregates. In process designated 2, in the table, all of the aggregates, that is the coarse aggregates and fine aggregates and powdered pitch were simultaneously mixed and the solvent was added to this mixture. In Process 3, all of the constituents, i.e. both the coarse and fine refractory aggregates, pitch and liquid solvent, were mixed simultaneously. In Process 4, both the coarse and fine refractory aggregates were first mixed and wetted by the liquified solvent and then powdered pitch was added thereto. In Process 5, the pitch was first liquified by the solvent and then added to both the fine and coarse aggregates.

Bars 1" x 1" x 6" long were pressed from the refractory compositions made according to the above five described processes and the crushing strength, porosity and density of the bars were measured after the bars were dried at 350° F. and also after the bars were coked. The crushing strength is the force required to crush the bars and is expressed in pounds per square inch. The porosity of the coked refractory composition is expressed in percent by weight and the bulk density in grams per cc.

In all of the processes 4.2 parts by weight trichloroethylene was added to the refractory composition. The refractory composition was dead burnt magnesite and it had a size consist set forth previously in the description of the refractory aggregates. The powdered pitch had a softening point of 350° F. and 6.6 parts by weight pitch was added to 100 parts by weight of the comminuted refractory.

Table I below sets forth the above physical properties of the refractory compositions prepared according to the different processes.

TABLE I

| Process | Crushing strength | | Porosity coked | Density coked |
|---|---|---|---|---|
| | Green | Coked | | |
| 1 | 357 | 2,935 | 18.7 | 2.70 |
| 2 | 336 | 2,228 | 18.6 | 2.69 |
| 3 | 408 | 2,342 | 18.9 | 2.69 |
| 4 | 48 | 1,633 | 22.7 | 2.55 |
| 5 | 72 | 643 | 22.3 | 2.57 |

The above table clearly illustrates that the wetting of the coarse aggregates with the liquid solvent and thereafter mixing an admixture of pitch and fine aggregates therewith results in a refractory composition that has a maximum coked strength and a low porosity when compared with refractory compositions made according to the other process. For example, in Process 2 the coked strength of the refractory composition is substantially below that of the refractory composition made according to Process 1. The refractory composition made according to Process 3 has a superior green crushing strength, however, the coked strength is well below that of the refractory composition made according to the preferred process, i.e. Process 1.

Table II and III set forth additional examples using various liquid organic hydrocarbon solvents in which powdered pitch is soluble in varying degrees. From Table II it is apparent that trichloroethylene, one of the preferred solvents, provides a refractory composition having all of the previously discussed desirable physical properties. In Table II, the porosity of the refractory composition both dried or green and coked was measured. It was found that the dry porosity of the refractory composition indicated the amount of solvent remaining in the refractory composition after being subjected to an elevated drying temperature. An excess amount of the solvent remaining in the refractory composition after drying is indicated by a low dry porosity. It was determined where an excess of the solvent remained after drying that further attempts to remove the solvent would result in a hardening or carbonization of the surface and a gasification of the solvent in the center of the chamber. The refractory compositions set forth in Table II were all prepared by the above described preferred process designated Process 1 in Table I.

TABLE II

| Solvents | Crushing strength | | Porosity | | Density coked | Percent sol. |
|---|---|---|---|---|---|---|
| | Green | Coked | Dry | Coked | | |
| Trichloroethylene | 357 | 2,935 | 11.4 | 18.7 | 2.70 | 4.2 |
| Carbon tetrachloride | 56 | 177 | 15.4 | 26.2 | 2.44 | 11.3 |
| Kerosene | 93 | 262 | 16.9 | 26.4 | 2.42 | 4.4 |
| Turpentine | 110 | 233 | 19.3 | 27.1 | 2.42 | 5.3 |
| Creosote | 608 | 2,440 | 8.0 | 18.9 | 2.66 | 4.5 |

Other organic solvents were admixed with the refractory aggregates according to the preferred process and cylinders were prepared and tested. Table III sets forth the physical properties of the refractory compositions using the enumerated solvents.

TABLE III

| Solvents | Crushing strength | | Porosity coked | Density coked |
|---|---|---|---|---|
| | Green | Coked | | |
| Trichloroethylene | 5,680 | 7,160 | 17.7 | 2.71 |
| Trichlorobenzene | 4,525 | 5,445 | 18.2 | 2.68 |
| Tetrachloroethylene | 3,240 | 4,780 | 22.1 | 2.56 |
| Methyl-ethyl-ketone | 2,970 | 4,300 | 22.6 | 2.57 |
| Benzene | 3,470 | 5,150 | 22.8 | 2.55 |
| Xylene | 3,170 | 5,020 | 23.0 | 2.53 |
| Toluene | 2,620 | 3,970 | 23.5 | 2.50 |

From the above, it is apparent in Table II carbon tetrachloride is unsuitable since it evaporates at a relatively low temperature and the evaporation losses during mixing prevent attaining the desired strengths and porosities. Further, in an attempt to form a refractory composition using the carbon tetrachloride between 11 and 15 parts by weight solvent were employed. Kerosene and turpentine do not produce acceptable strength, porosities, or densities. Creosote is effective and gives good properties. It was not possible, however, to remove the creosote by drying the small rectangular bars. It would be far more difficult to dry a large commercial size brick without rupturing or cracking the surface. The large amount of solvent remaining in the refractory composition is indicated by the porosity of the dried composition. It was found that the center of the cylinder, after drying, was soft and contained a substantial amount of creosote solvent. It is believed the problem encountered with the creosote solvent is attributable to its boiling range which is between about 200° C. and 325° C.

In Table III acceptable strengths were obtained with the chlorinated hydrocarbons especially the trichlorinated hydrocarbons. Although the powdered pitch is supposedly more soluble in the other solvents enumerated in Table III, the remaining solvents appear to be absorbed by the pitch particles without liquifying the pitch whereas trichloroethylene and trichlorobenzene in substantially the same amounts as the remaining solvents liquifies and dissolves the pitch particles to reduce the viscosity and form a readily flowable liquid.

According to the provisions of the patent statutes, the principle, preferred construction, and mode of operation of the invention have been illustrated and described and is now considered to represent its best embodiment. However, it is desired to have it understood that, within the scope of the appended claims, the invention may be practiced otherwise than as specifically illustrated and described.

What is claimed is:
1. A method of preparing a pitch bonded refractory shaped article for use in an oxygen steel making vessel having sufficient strength to support a molten metal charge in the vessel and a low porosity to reduce erosion of the lining surface by the molten metal comprising,
   obtaining refractory aggregates having a spectrum of sizes less than 4 mesh Tyler Standard Screen,
   separating said refractory aggregates into a coarse fraction having a size consist of between 4 mesh Tyler Standard Screen and 200 mesh Tyler Standard Screen and a fine fraction having a size less than 200 mesh Tyler Standard Screen,
   wetting the surface of said coarse fraction of refractory aggregates with between 2 and 11 parts by weight of a normally liquid hydrocarbon solvent in which pitch is soluble and readily liquefies,
   admixing between 5 to 8 parts by weight of particulate pitch having a size consist wherein substantially all of said particulate pitch passes through a 150 mesh Tyler Standard Screen with said fine fraction of refractory aggregates,
   coating said coarse fraction of refractory aggregates with said admixture of said particulate pitch and fine refractory aggregates to encapsulate said coarse refractory aggregates with said particulate pitch, and
   thereafter forming said refractory aggregates encapsulated with said pitch into a refractory shape.
2. The method of claim 1 further including the step of drying said refractory shape at an elevated temperature below the carbonization temperature of said pitch to evaporate a substantial portion of said liquid hydrocarbon solvent.
3. A refractory composition for use as a refractory lining in an oxygen steel making vessel consisting essentially of particulate coarse refractory aggregates uniformly coated with an admixture of between about 5 to 8 parts by weight of a pitch having a softening point of between about 132° C. and 232° C. and a Conradson coking value of more than 50% by weight dissolved in between about 2 and 11 parts by weight of normally liquid trichlorinated hydrocarbon having a boiling range between 80° C. and 200° C., and fine refractory aggregate.
4. The refractory composition of claim 3 wherein said liquid trichlorinated hydrocarbon is trichloroethylene.
5. The refractory composition of claim 3 wherein said liquid trichlorinated hydrocarbon is trichlorobenzene.

References Cited

UNITED STATES PATENTS 2,270,181   1/1942   Cole et al. _____ 106—56

FOREIGN PATENTS 690,859   4/1953   Great Britain.

JAMES E. POER, *Primary Examiner.*

U.S. Cl. X.R.
106—56, 59, 63, 65